(12) United States Patent  (10) Patent No.: US 7,811,654 B2
Shoji et al.  (45) Date of Patent: Oct. 12, 2010

(54) GATE-PROCESSED MOLDINGS

(75) Inventors: Masakazu Shoji, Tokyo (JP); Keishi Fujii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 22 days.

(21) Appl. No.: 11/666,820

(22) PCT Filed: Sep. 13, 2005

(86) PCT No.: PCT/JP2005/016844

§ 371 (c)(1),
(2), (4) Date: May 1, 2007

(87) PCT Pub. No.: WO2006/070515

PCT Pub. Date: Jul. 6, 2006

(65) Prior Publication Data

US 2008/0044613 A1  Feb. 21, 2008

(30) Foreign Application Priority Data

Dec. 27, 2004  (JP)  ............ P2004-376930

(51) Int. Cl.
*B32B 3/00* (2006.01)
*B32B 3/28* (2006.01)
*B32B 3/30* (2006.01)

(52) U.S. Cl. ............ 428/156; 428/167
(58) Field of Classification Search ........ 428/156, 428/167; 249/105; 425/DIG. 51; 264/138, 264/161, 163, 328.1, 328.9, 328.12
See application file for complete search history.

(56) References Cited

U.S. PATENT DOCUMENTS

| 4,200,142 A | * | 4/1980 | Lange ............ 164/359 |
| 4,252,294 A | | 2/1981 | Uchio |
| 4,380,423 A | | 4/1983 | Aoki |

FOREIGN PATENT DOCUMENTS

| DE | 30 39 525 C2 | | 4/1981 |
| JP | 54-129054 A | | 10/1979 |
| JP | 56136343 A | * | 10/1981 |
| JP | 56-146525 U | | 11/1981 |
| JP | 60-255409 A | | 12/1985 |
| JP | 62-128817 U | | 8/1987 |
| JP | 1-156019 U | | 10/1989 |
| JP | 6-5930 U | | 1/1994 |
| JP | 7-205201 A | | 8/1995 |
| JP | 9-262874 A | | 10/1997 |
| JP | 09262874 A | * | 10/1997 |
| JP | 2589085 Y2 | | 11/1998 |
| JP | 2001-138366 A | | 5/2001 |
| JP | 2001138366 A | * | 5/2001 |
| JP | 2002-240108 A | | 8/2002 |
| JP | 2005-215497 A | | 8/2005 |
| WO | WO-79/00235 A1 | | 5/1979 |

* cited by examiner

*Primary Examiner*—David R Sample
*Assistant Examiner*—Catherine Simone
(74) *Attorney, Agent, or Firm*—Birch, Stewart, Kolasch & Birch, LLP

(57) ABSTRACT

In gate-processed moldings fabricated by cutting off a gate 5 formed on resin moldings 1 during molding of the resin moldings 1, an introducing section 4 for cutting off the gate is formed thereon.

6 Claims, 4 Drawing Sheets (A)

(B)

(A)

(B)

GATE-PROCESSED MOLDINGS

TECHNICAL FIELD

The present invention relates to gate-processed moldings fabricated by cutting off a gate of a runner thereof formed during resin molding.

BACKGROUND ART

Conventional gate-processed moldings are generally fabricated by injection molding. During molding, resin material is injected into a mold through a runner, and the resin builds into moldings with the runner after resin molding. A gate of the runner is cut off. In many cases, however, the fact is that a cutting-off of the runner is manually carried out by means of cutting tools such as a cutting nipper or the like. Additionally, a pin-gate method of automatically or mechanically cutting off the gate has already been known (see Patent Documents 1 and 2, for example).

Patent Document 1: JP-A60-255409 (p. 3, FIG. 1)

Patent Document 2: JU-A6-5930, microfilm (p. 8, FIG. 6)

The conventional gate-processed moldings are fabricated as mentioned above. Therefore, when cutting off the gate, a cutting tool tends to slip transversely over the gate, and a cutting edge of the cutting tool is not held constant in a certain position. As a result, resultant dimensions of the gate vary from moldings to moldings, leading to a lowering of finish precision of the moldings. Moreover, in order to reduce, as far as possible, the gate residuum after cutting off of the gate, manually pressing the cutting edge of the cutting tool against a base of the gate and artificially cutting off that position takes much time for a cutting-off operation of the gate, which gives rise fall off of productivity thereof. Note that even if the invention of Patent Documents 1 and 2 may automatically cut off the gate, the cut position is not always held constant from moldings to moldings. In particular, any technical consideration is not given to effective utilization of the gate residuum.

The present invention has been made to solve the above-mentioned problems, and an object of the present invention is to provide gate-processed moldings capable of cutting off the gate of resin moldings at a fixed position from moldings to moldings, and of effectively using the gate residuum.

DISCLOSURE OF THE INVENTION

The gate-processed moldings according to the present invention is fabricated by cutting off a gate formed, on resin moldings, during molding of the resin moldings, wherein an introducing section is molded on the gate for cutting off the gate.

According to the present invention, the introducing section formed on the gate of the resin moldings insures stable positioning of the cutting edge of the cutting tool at a position of the gate. For this reason, this cuts off the gate of the moldings at a fixed position without having to change molding facilities and metal molds, which enhances finish precision and productivity of the resin moldings. Further, in case the resin moldings are, e.g., for operation buttons for pushing a switch, one can contrive to effectively use the gate residuum as a positioning protrusion to position the operation buttons with respect to an exterior panel. As a result, the gate residuum can play an important role in preventing a wrong insertion of the operation buttons.

BEST MODE FOR CARRYING OUT THE INVENTION

Embodiments of the present invention will now be described with reference to the accompanying drawings for describing in detail the present invention.

First Embodiment

Figure 1:
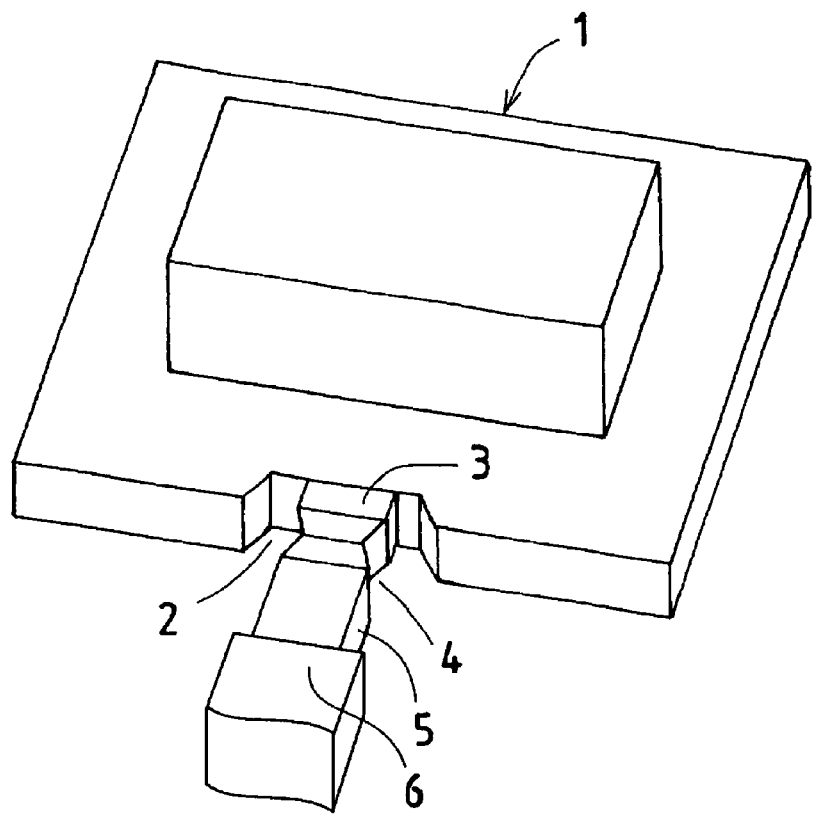
FIG. 1 is a schematic oblique view showing gate-processed moldings according to the first embodiment of the present invention in connection with a runner formed during die molding.
Figure 2:
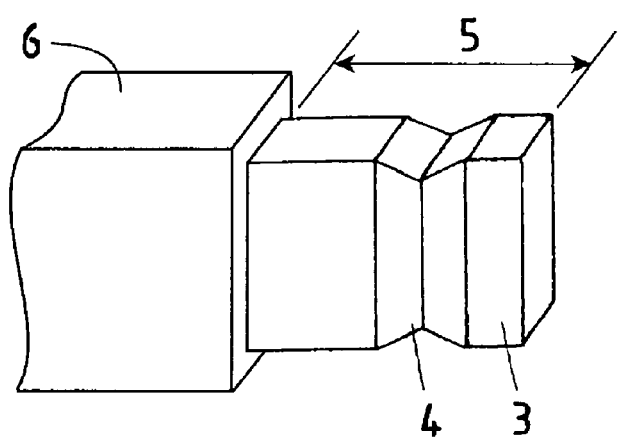
FIG. 2 is an oblique view explaining a gate shown in FIG. 1 in connection with the runner.

FIG. 1 is a schematic oblique view showing gate-processed moldings according to the first embodiment of the present invention in connection with a runner and a gate formed during die molding. FIG. 2 is an oblique view explaining the gate-processed moldings in connection with the gate 5 and the gate residuum 3 shown in FIG. 1.

The gate-processed moldings (hereinafter, referred also to as "resin-moldings") 1 shown in FIG. 1 are molded by injecting resin material into a molding die (not shown) from the runner 6 through the gate 5, and the runner 6 and the gate 5 are formed on the resin-moldings 1 by separating the moldings from the die. During molding of such resin moldings 1, it is arranged, in the first embodiment, that a concave 2 for gate clearance be molded on an side edge of the resin moldings 1 and an introducing section 4 having a V-shaped groove in cross section be molded around the periphery of the gate 5 stretching to the inner wall of the concave 2 at the time of injection of resin material.

Herein, the gate 5 is formed, e.g., into a square cross section of 2 mm×2 mm, of which depth of the V-shaped groove forming the introducing section 4 is set to 0.2-0.3 mm and its cutting edge angle is set to 45° such that dimensions of the molded part of the gate 5 is 0.3 mm. The gate 5 with the aforementioned V-shaped introducing section 4 is formed on the resin moldings 1 after injection molding, by injecting the resin material into a die from the runner 6 having such cross section through the gate 5.

As described above, according to the first embodiment, since it is arranged such that the V-shaped introducing section 4 is formed on the gate 5 of the resin moldings 1 after die molding, during cutting off of the gate 5, it permits an edge of the cutting tool to introduce to a position of the gate 5 to be cut along the introducing section 4, thus enabling easy positioning of the cutting edge at that position. For this reason, it allows stable cutting off of the gate 5 at a fixed position every a plurality of resin moldings 1, and the cut surface offers an excellent machined surface, thus enhancing finish precision of the resin moldings 1. Further, as stated above, the gate residuum 3 of each of the resin moldings 1 cut uniformly, which enables dimensions of the gate clearance to be quantitatively determined during resin molding. Accordingly, any particular consideration of the dimensions of the gate clearance is not necessary at the time of design thereof.

As described above, according to the first embodiment, since it is arranged such that the V-shaped introducing section 4 is formed on the gate 5 of the resin moldings 1 after die molding, during cutting off of the gate 5, it permits an edge of the cutting tool to introduce to a position of the gate 5 to be cut along the introducing section 4, thus enabling easy positioning of the cutting edge at that position. For this reason, it allows stable cutting off of the gate 5 at a fixed position every a plurality of resin moldings 1, and the cut surface offers an excellent machined surface, thus enhancing finish precision of the resin moldings 1. Further, as stated above, the gate residuum 3 of each of the resin moldings 1 cut uniformly, which enables dimensions of the gate clearance to be quantitatively determined during resin molding. Accordingly, any particular consideration of the dimensions of the gate clearance is not necessary at the time of design thereof.

Second Embodiment

Figure 3:
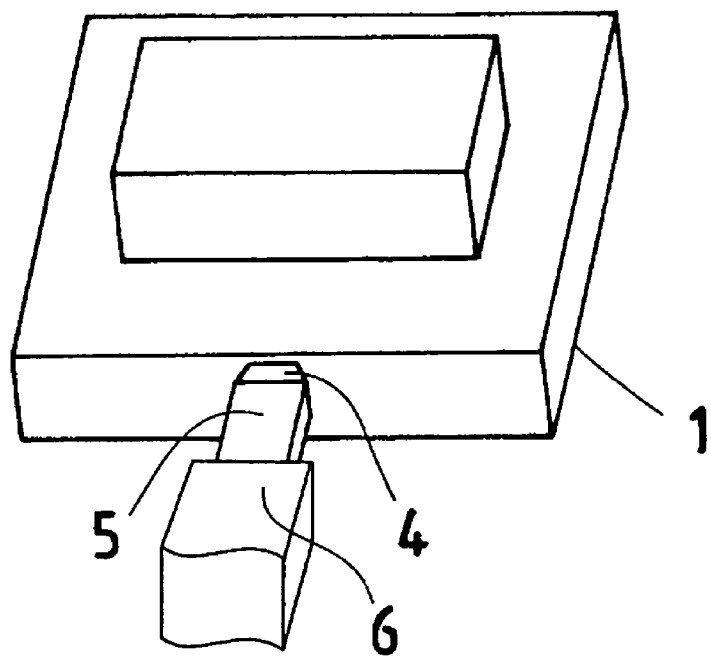
FIG. 3(A) is a schematic oblique view showing gate-processed moldings according to the second embodiment of the present invention in connection with the runner.
FIG. 3(B) is an oblique view of the gate shown in FIG. 3(A).
Figure 3:
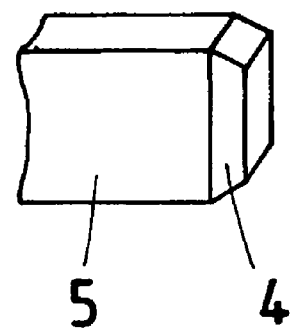

FIG. 3(A) is a schematic oblique view showing gate-processed moldings according to the second embodiment of the present invention in connection with the runner 6 and the gate 5. FIG. 3(B) is an oblique view of the gate 5 shown in FIG. 3(A).

The second embodiment is arranged such that the introducing section 4 be formed on the gate 5 of the resin moldings with the introducing section 4 getting closer to the resin moldings 1. In the second embodiment, the introducing section 4, formed in the shape of a vertical groove on one side, slanted taper-like toward a vertical side face of the resin moldings 1, between the gate 5 and the vertical side face of the resin moldings 1.

According to the second embodiment thus arranged, it eliminates the concave (gate clearance) 2 in the first embodiment, and sharply shortens the gate residuum 3, as well as enables simultaneous cutting off of each gate 5 of the resin moldings 1 by fixing a plurality of resin moldings 1 in a superposed manner such that the introducing section 4 of the gate 5 of the resin-moldings 1 stands in a line. Further, the second embodiment also enables free adjustment of the length of the gate residuum 3. The elongation of the gate residuum 3 by the grace of the adjustment makes possible to avail itself as a careless wrong-operation preventing member for the resin moldings 1 (as a protrusion for preventing a wrong insertion of the resin moldings 1 in inserting the moldings into the corresponding mounting member) etc.

Third Embodiment

Figure 4:
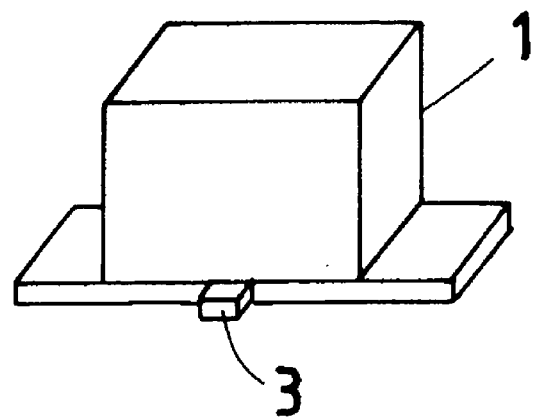
FIG. 4 is an oblique view showing gate-processed moldings according to the third embodiment of the present invention.

FIG. 4 is an oblique view showing gate-processed moldings according to the third embodiment of the present invention. The resin moldings 1 according to the third embodiment 3 are molded as a button for a switching operation. The gate residuum 3 is used in substitution for the protrusion, for preventing the careless wrong operation, provided on the button. The cross-sectional shape (cut end) of the gate residuum is rectangular or trapezoidal. According to the third embodiment thus arranged, it can take advantage of the gate 5 of the resin moldings 1 as a careless wrong-operation preventing member for the resin moldings 1.

Fourth Embodiment

Figure 5:
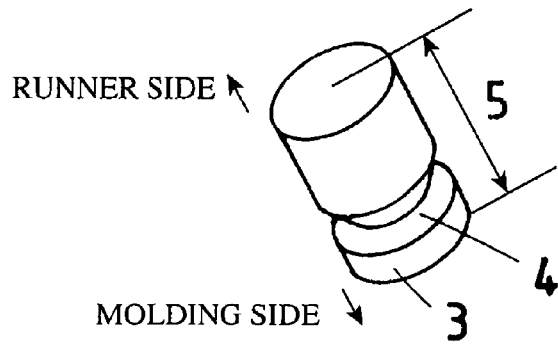
FIG. 5 is an oblique view showing gate-processed moldings according to the fourth embodiment of the present invention.

FIG. 5 is an oblique view showing the gate residuum of gate-processed moldings according to the fourth embodiment of the present invention. The fourth embodiment is arranged such that the gate 5 of the resin moldings 1 shown in the respective embodiments described above be molded in columnar shape, and the introducing portion 4 having a V-shaped groove in cross section be formed around a circumferential face of the gate 5 in the circumferential direction. The fourth embodiment 4 also may have an effect similar to those of the respective embodiments described above.

Fifth Embodiment

Figure 6:
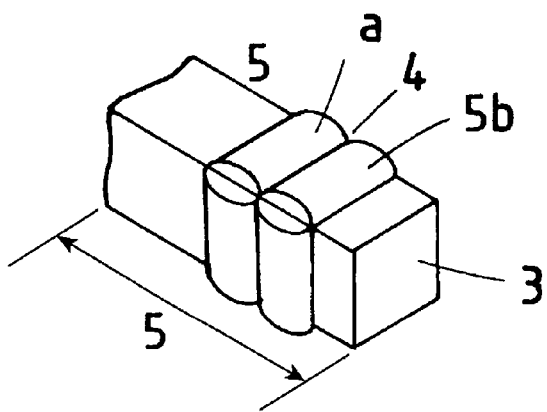
FIG. 6 is an oblique view showing gate-processed moldings according to the fifth embodiment of the present invention.

FIG. 6 is an oblique view showing the gate residuum of gate-processed moldings according to the fifth embodiment of the present invention. The fifth embodiment is arranged such that the gate 5 be molded in rectangular shape, protuberances 5a, 5b adjacent to each other in a semi-circle be molded, respectively, and the almost V-shaped introducing section 4 be formed between the semi-circle protuberances 5a, 5b.

Accordingly, the runner applied to molding of the gate-processed moldings according to the fifth embodiment is arranged to have a sectional form permitting an integral formation of the rectangular-shaped gate 5 and the protuberances 5a, 5b, which are protuberant in a semi-circle on each face of the gate 5 and are adjacent to each other.

Herein, when the thickness of the rectangular-shaped gate described above is thin, the formation of the grooved introducing section 4 on each face of the gate 5 still further thins the thickness of the gate 5. For this reason, there is a possibility of occurring a deficiency that a flow of resin injected into the die through the runner makes worse and its influence is exerted in the thickness direction of the gate 5.

On the contrary, according to the fifth embodiment thus arranged as above, when the thickness of the gate 5 is thin, the protuberances 5a, 5b are formed on faces of the gate, so that such deficiency will not be taken place in the thickness direction of the gate 5. This allows providing the introducing section 4 on all faces of the gate 5, thereby expecting to have an effect similar to those of the respective embodiments described above. Remark parenthetically, in the fifth embodiment, it needs not to form the introducing section 4 provided between the protuberances 5a, 5b over the whole surface of the gate 5. Even when the introducing section 4 is formed on vertical two faces or on horizontal two faces of the gate 5, it promises to have an effect similar to those of the respective embodiments by specifying a direction along which the cutting edge of the cutting tool is introduced through the introducing section 4.

Sixth Embodiment

Figure 7:
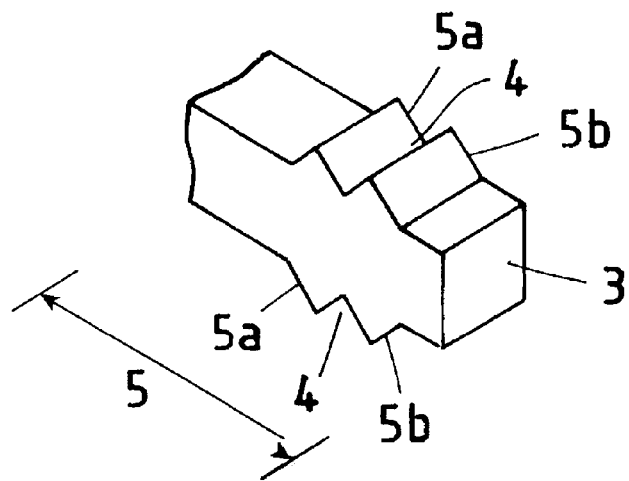
FIG. 7 is an oblique view showing gate-processed moldings according to the sixth embodiment of the present invention.

FIG. 7 is an oblique view showing the gate 5 of gate-processed moldings according to the sixth embodiment of the present invention. The sixth embodiment is arranged such that the protuberances 5a, 5b adjacent to each other in a triangle in cross section are provided on symmetrical surfaces of the gate 5 molded in a rectangle, as with the fifth embodiment, and that the V groove formed between the protuberances 5a, 5b is taken as the introducing section 4. Therefore, the sixth embodiment may have an effect similar to that of the fifth embodiment described above.

Seventh Embodiment

Figure 8:
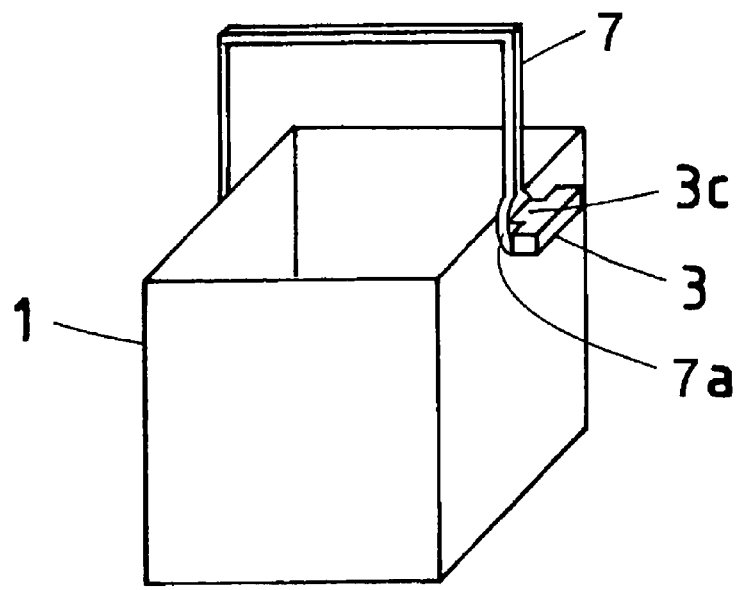
FIG. 8 is an oblique view showing a gate residuum of gate-processed moldings according to the seventh embodiment of the present invention.
Figure 9:
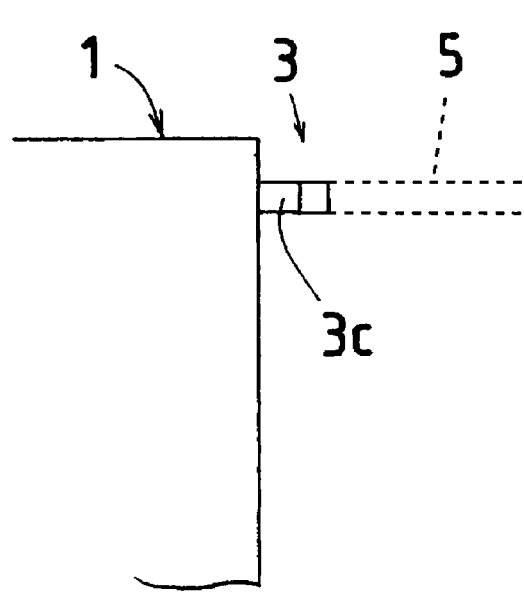
FIG. 9(A) is a partial front view of the moldings shown in FIG. 8.
FIG. 9(B) is a partial side view of a handle shown in FIG. 8.
Figure 9:
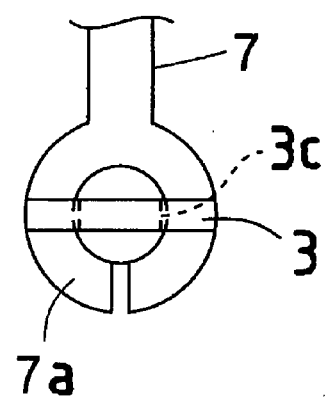

FIG. 8 is an oblique view showing the gate residuum of gate processed moldings according to the seventh embodiment of the present invention. FIG. 9(A) is a partial side view of the moldings shown in FIG. 8. FIG. 9(B) is a partial front view of the handle shown in FIG. 8.

The seventh embodiment is arranged such that a container be molded as the resin moldings 1, and the gate residuum 3 formed on the resin moldings 1 be so formed a hook to hook the handle 7 of the container. In the seventh embodiment, the gate residuum 3 is formed such that a head of the residuum is formed so as to have a planate convex in shape, and a forked mounting portion 7a of the handle 7 is mounted around a neck 3c. Say in addition, even in the seventh embodiment, the introducing section 4 is formed on a convex top of the gate residuum 3 formed on the resin moldings 1 side during molding of the resin moldings 1.

The seventh embodiment allows formation of the gate residuum 3 having various shapes by exerting ingenuity in shape of the gate 5 of the runner 6, such as by forming the gate residuum 3 of the resin moldings 1 in convex shape. As a result, the seventh embodiment can be applied to various uses. Further, the shape of the introducing section 4 can be flexibly and easily changed according to the shape of the gate 5 and characteristic of the resin moldings 1.

INDUSTRIAL APPLICABILITY

As mentioned above, the gate-processed moldings according to the present invention is suitable for making effective use of the gate residuum by holding the cut position of the gate of the resin moldings constant.

The invention claimed is:

1. Gate-processed moldings fabricated by injecting resins material into a molding die from a runner through a gate during molding of resin moldings, comprising:
   an introducing section provided on the gate, and having a shape of vertical groove on one side and slanted tapered shape toward a vertical side face of the resin moldings; and
   a gate residuum formed between the resin moldings and the introducing section,
   wherein the runner's cross-sectional area is larger than the gate's cross-sectional area,
   the gate's cross-sectional area is rectangular in shape, and
   the introducing section is located on each of four faces of surface on the gate.

2. Gate-processed moldings fabricated by injecting resin material into a molding die from a runner through a gate during molding of resin moldings, comprising:
   protuberances provided on the gate, the protuberances are protuberant from a periphery of the gate and adjacent to each other;
   an introducing section formed between the protuberances; and
   a gate residuum formed between the resin moldings and the introducing section.

3. The gate-processed moldings according to claim 2, wherein the gate has a rectangular shape and the protuberances are protuberant in a semi-circle on each face of the gate.

4. The gate-processed moldings according to claim 2, wherein the protuberances are arranged such that they adjacent to each other in a triangle in cross-section provided on symmetrical surfaces of the gate molded in a rectangle.

5. The gate-processed moldings according to claim 2, wherein the introducing section is formed on vertical two faces or horizontal two faces of the gate.

6. Gate-processed moldings fabricated by injecting resin material into a molding die from a runner though a gate during molding of resin moldings, comprising:
   an introducing section provided on the gate; and
   a gate residuum, as a hook for a handle having a forked portion, formed between the resin moldings and the introducing section, and formed into a planate convex shape at a head of said gate residuum adjacent to the introducing section,
   wherein the gate residuum as a neck portion surrounded by the forked portion of the handle when mounting said handle with said gate residuum.

* * * * *